Feb. 21, 1928.

R. R. BLOSS ET AL 1,659,989

CROWN BLOCK BEARING

Filed April 5, 1927

Richard R. Bloss
Roy C. Pfeil
INVENTOR.

BY Edwin P. Corbin
ATTORNEY.

Patented Feb. 21, 1928.

1,659,989

UNITED STATES PATENT OFFICE.

RICHARD R. BLOSS AND ROY C. PFEIL, OF COLUMBUS, OHIO, ASSIGNORS TO THE INTERNATIONAL DERRICK & EQUIPMENT COMPANY, OF COLUMBUS, OHIO, A CORPORATION OF OHIO.

CROWN BLOCK BEARING.

Application filed April 5, 1927. Serial No. 181,230.

Our invention relates to crown block bearings and pertains especially to the provision of bearings of simple construction which are readily adjustable.

Heretofore, crown block bearings, when adjustable, have been equipped with an unnecessary number of bolts or securing means. Usually, these adjustable bearings have been so constructed as to be larger than is desirable under many conditions of installation. Likewise, they have usually been of such a structure as to limit a given bearing to use with a given size beam or with a comparatively small number of different sized beams; or, when made applicable to numerous sizes of beams, the structures utilized have resulted in undue complications.

We have provided a novel type of bearing which is of extremely simple construction. At the same time, the bearing which we have devised is readily adjustable both laterally and longitudinally of the beam upon which it is mounted and, in fact, is capable of a partial rotatory adjustment. Likewise, our novel type of bearing is readily adjustable to fit beams which are provided with flanges of different dimensions.

Furthermore, when two of our bearings are utilized in the normal manner, they are capable of ready adjustment toward and from each other.

We preferably attain the various features of adjustability of our bearings by utilizing adjustable hook bolts. These adjustable hook bolts are of peculiar construction and, in conjunction with the complemental parts of the bearing, they not only serve to secure the bearings to the beams but they serve to make possible the various adjustments indicated without detracting from the security and rigidity of attachment of the bearings to the beams upon which they are mounted.

The preferred embodiment of our invention is shown in the accompanying drawings wherein similar characters of reference designate corresponding parts and wherein Figure 1 is a side view of one of our bearings, partly broken away, illustrating the manner in which the bearings may be adjusted with relation to the supporting beam.

Figure 3:
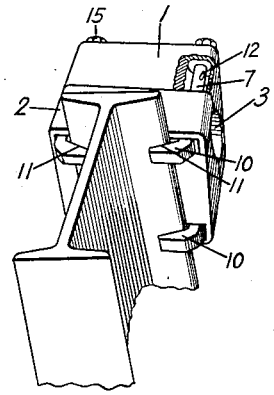
Figure 3 is a perspective view of a beam with one of our bearings attached in diagonal relation.
Figure 4:
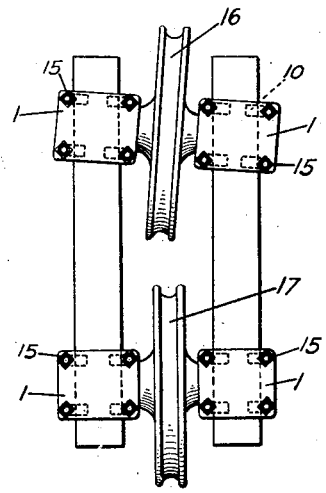
Figure 4 is a plan view of two sheaves mounted upon spaced beams and illustrating the rotatory adjustment of one set of our bearings so that one sheave may be disposed at an angle with relation to another sheave.

In the drawings, our invention is shown as comprising a lower section 1 and an upper section 2 designed to be superimposed thereon. These sections are provided, as shown in Figure 3, with complemental semi-cylindrical grooves that cooperate to form a journal bearing 3.

Figure 1:
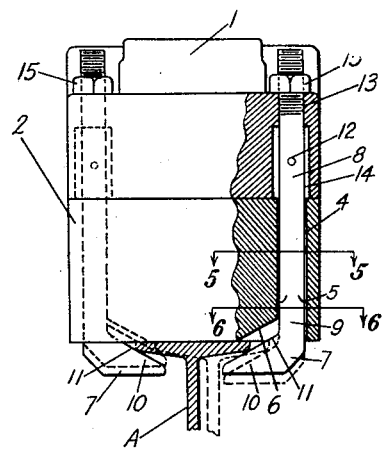
Figure 5:
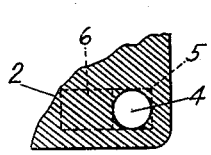
Figure 5 is a section taken on line 5—5 of Figure 1.
Figure 6:
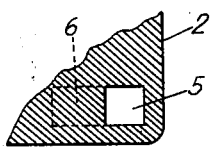
Figure 6 is a section taken on line 6—6 of Figure 1.

As shown best in Figures 1, 5 and 6, the lower section 1 of the bearings is provided in each of its four corners with bolt holes. These bolt holes are circular in cross-section in the upper parts thereof, as at 4, and are rectangular in cross-section in the lower parts thereof, as at 5. The lower ends of the rectangularly formed portions 5 of the holes are flared in one direction, as at 6, for a purpose that will subsequently be made apparent.

Mounted within these holes of the block section 1, are claw-footed bolts 7. These bolts 7 are threaded at their upper ends and are circular in cross-section from their upper ends downwardly for a greater portion of their lengths, as at 8. However, adjacent their lower ends for a substantial distance, they are rectangular in cross-section, as at 9. The feet of these bolts are claw-shaped as at 10 and are provided with wedged surfaces 11. By examination of the drawings, it will be apparent that the cylindrical portions 8 of the bolts fit closely in the cylindrical holes 4 of the lower block section while the rectangular portions 9 of the bolts fit closely in the rectangular portions 5 of the holes. Above the block 1, these bolts are provided with cotter pins or keys 12 which permit of vertical movement of the bolts in their holes but prevent such bolts from falling downwardly out of such holes.

The upper sections 2 of our bearing is, likewise, formed with a vertical hole in each of the four corners thereof. These holes are so located that they may be readily aligned with the previously-described bolt holes in the lower section 1 of the block.

These holes in the upper section 2 of the block are circular in cross-section throughout their length but they comprise upper holes 13 which are concentric with and which communicate with lower holes 14. These lower holes 14 are larger in cross-section than the upper holes 13 and, in fact, are sufficiently large to permit free up and down movement of the cotter pins 12. Nuts 15 are provided for the upper threaded ends 7 of the bolts.

Figure 2:
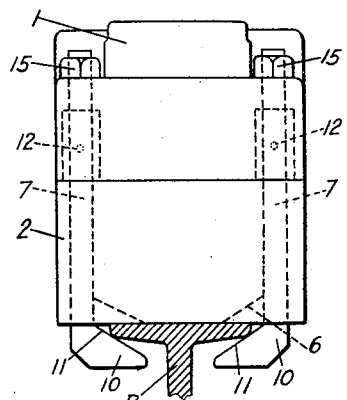
Figure 2 is a side view of one of our bearings showing the manner in which the hook bolts may be adjusted to fit the flanges of a larger beam than that shown in Figure 1.

In operation, each bearing is, preferably, placed upon an I-beam A, as in Figure 1, or as at B, in Figure 2. The claw feet of the bolts are designed to embrace the upper flanges of the I-beam. When applying the bearing, the upper section 2 is removed by first removing the nuts 15. When this is done, the bolts drop downwardly until the cotter pins 12 rest upon the upper surface of the section 1, at which time the rectangular portions of the bolts have passed below the rectangular portions of the holes and the claw feet may be rotated sufficiently to clear the flange of the I-beam.

When this has been accomplished, the journal of a sheave 16 or 17 is placed within the semi-cylindrical recess in the top of the section 1. Then, section 2 is superimposed upon the section 1 so that the journal of the sheave is embraced by the cylindrical recess and the bolt holes in the section 2 receive the upper ends of the bolts which have been prevented from dropping downwardly out of the section by the cotter pins 12.

At this time, the bolts are lifted upwardly until the wedged surfaces 11 of the claw feet are in close proximity to the under surfaces of the flanges of the beam. The nuts 15 are then applied and are tightened until the flanges of the beam are firmly clasped between the lower surface of the section 1 and the wedged surface 11 of the claw foot of each bolt. It will be observed that the flanged surface 6 and the cutaway portion immediately therebeneath permit of variable positions of vertical adjustment of the bolts, this being further permitted by the enlarged bolt holes 14 in the upper section 2. The one result is that beams whose flanges are of different weight and thickness may be clasped with equal firmness and rigidity by the same set of bolts, this being illustrated by a comparison of Figures 1 and 2 of the drawings. Furthermore, the bearing may be shifted laterally without moving the beam by raising the claw feet of the bolts on the other side of the bearing, owing to the fact that the inclined or wedged surface 11 of the claw feet may grip the beam flanges at various points of contact with equal firmness. Also, by manipulating these bolts so that the bolts on one end of the bearing project unequal distances below the bearing and that the bolts on the opposite end of the bearing also project unequal distances in opposite directions, while all of the bolts clamp the beam flange, a sheave may be held firmly at an angle to the direction of extension of the beam, as shown in Figure 1.

Thus, it will be seen that we have provided a novel and simple form of bearing structure wherein the bolts which clamp the bearing sections together also clamp the bearing to the beam. It will also be seen that these same bolts are adjustable to permit adjustment of the bearings and the beam relatively to varying positions. It will likewise be seen that we have provided a very simple bolt structure which permits of partially rotating the bolts to facilitate application and, yet, which ensures against the accidental rotation of these bolts when they are in clamping position. Likewise, it will be evident that the upper sections of our bearing blocks are readily removable and, yet, bolts, though dropping to a position to facilitate ready application, are prevented from dropping entirely out of the lower bearing block.

Having thus described our invention, what we claim is:

1. A crown block bearing comprising a lower section, an upper section, means for securing said sections together, the same means securing said sections to a beam, said means being constructed to permit relative lateral adjustment of said bearing and said beam.

2. A crown block bearing comprising a lower section, an upper section, means for securing said sections together, the same means securing said sections to a beam, said means being constructed to permit application to beams having flanges of varying dimensions.

3. A crown block bearing comprising a lower section, an upper section, means for securing said sections together, the same means securing said sections to a beam, said means being adjustable to permit partial relative rotation of said bearing and said beam to which it is attached.

4. Means for attaching an element to a beam comprising gripping members with inclined gripping surfaces, the incline of these surfaces being such that adjustment of said members to attach the element to different width beams will result in contacting of different locations on said surfaces with the beams but with equal degrees of rigidity.

5. Means for attaching an element to a beam comprising gripping members with inclined gripping surfaces, the incline of these surfaces being such that adjustment of said members to attach the element to different width beams will result in contacting of different locations on said surfaces with the beams but with equal degrees of rigidity by endwise adjustment of said gripping members.

6. Means for attaching an element to a beam comprising gripping members so constructed that said element can be adjusted laterally to different positions on said beam by independent adjustment of said members to varying degrees, said members having gripping surfaces so inclined that such adjustment thereof will result in contacting of different locations on said surfaces with the beams but with equal degrees of rigidity.

7. Means for attaching an element to a beam comprising gripping members so constructed that said element can be adjusted rotatably to different positions on said beam by independent adjustment of said members to varying degrees, said members having gripping surfaces so inclined that such adjustment thereof will result in contacting of different locations on said surfaces with the beams but with equal degrees of rigidity.

8. Means for attaching an element to a beam comprising gripping members with inclined gripping surfaces, the incline of these surfaces being such that adjustment of said members to attach the element to different width beams will result in contacting of different locations on said surfaces with the beams but with equal degrees of rigidity by independent adjustment of said gripping members to varying degrees.

9. A crown block bearing comprising a block made up of a lower and upper section, each section being provided with holes extending therethrough, the holes adjacent the bottom of said lower section having a portion cut away, and gripping members extending through the holes in each of said sections and having at their lower ends inclined surfaces engaging the flange of a beam.

10. A crown block bearing comprising a block made up of a lower and upper section, each section being provided with holes extending therethrough, the holes adjacent the bottom of said lower section having a portion cut away, and gripping members extending through the holes in each of said sections and having at their lower ends inclined surfaces engaging beam flanges of varying dimensions.

11. A crown block bearing comprising a block made up of a lower and upper section, each section being provided with holes extending therethrough, the holes adjacent the bottom of said lower section having a portion cut away, and gripping members extending through the holes in each of said sections and having at their lower ends inclined surfaces, the inclined surfaces of said members being arranged at opposite edges of the lower block section and extending downwardly and inwardly to engage the opposite edges of a beam flange.

12. A crown block bearing comprising a block made up of a lower and upper section, each section being provided with holes extending therethrough, the holes adjacent the bottom of said lower section having a portion cut away, and gripping members extending through the holes in each of said sections and having at their lower ends inclined surfaces engaging the flange of a beam, the incline of these surfaces being such that the said block can be attached to beams of varying degrees of rigidity by independent adjustment of said gripping members to varying degrees.

In testimony whereof we hereby affix our signatures.

RICHARD R. BLOSS.
ROY C. PFEIL.